(12) United States Patent
Hashimoto et al.

(10) Patent No.: US 10,498,278 B2
(45) Date of Patent: Dec. 3, 2019

(54) MOTOR CONTROLLER

(71) Applicant: FANUC CORPORATION, Yamanashi (JP)

(72) Inventors: Shoutarou Hashimoto, Yamanashi (JP); Yuuki Morita, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/019,918

(22) Filed: Jun. 27, 2018

(65) Prior Publication Data
US 2019/0036470 A1   Jan. 31, 2019

(30) Foreign Application Priority Data
Jul. 28, 2017 (JP) .................................. 2017-146983

(51) Int. Cl.
| H02P 23/00 | (2016.01) |
| H02P 23/08 | (2006.01) |
| H02P 23/14 | (2006.01) |
| B23Q 5/10 | (2006.01) |

(52) U.S. Cl.
CPC ............. *H02P 23/08* (2013.01); *H02P 23/14* (2013.01); *B23Q 5/10* (2013.01); *B23Q 2220/006* (2013.01); *B23Q 2705/02* (2013.01)

(58) Field of Classification Search
CPC ........ H02P 23/08; H02P 25/062; H02P 21/09; H02P 23/14; H02P 21/18
See application file for complete search history.

(56) References Cited

U.S. PATENT DOCUMENTS 5,820,350 A * 10/1998 Mantey ................. E21B 43/126
   417/45
2018/0167015 A1    6/2018 Wu

FOREIGN PATENT DOCUMENTS

| CN | 1974181 | 6/2007 |
| CN | 101034868 | 9/2007 |
| CN | 101909922 | 12/2010 |
| JP | 2010-161875 | 7/2010 |
| JP | 2013-240194 | 11/2013 |
| JP | 5435252 | 12/2013 |

(Continued)

OTHER PUBLICATIONS

Office Action dated Sep. 4, 2019 in corresponding Chinese Patent Application No. 201810818794.0.

*Primary Examiner* — Karen Masih
(74) *Attorney, Agent, or Firm* — Wenderoth, Lind & Ponack, L.L.P.

(57) ABSTRACT

A motor controller includes: a rotation speed estimating unit that estimates a rotation speed of a motor on the basis of current information and primary frequency information of the motor; a proximity switch that outputs an ON signal when a portion of a rotating body of the motor is in proximity and outputs an OFF signal when a portion of the rotating body of the motor is not in proximity; a rotation speed computing unit that computes a rotation speed of the motor on the basis of the ON signal and the OFF signal; and a state determining unit that determines whether a present state is a speed attainment state and whether a present state is a speed zero state on the basis of a rotation speed estimation value estimated by the rotation speed estimating unit and a rotation speed computation value computed by the rotation speed computing unit.

5 Claims, 6 Drawing Sheets

(56) References Cited

FOREIGN PATENT DOCUMENTS

| JP | 5929492 | 6/2016 |
|---|---|---|
| WO | 2008/007541 | 1/2008 |

* cited by examiner

MOTOR CONTROLLER

This application is based on and claims the benefit of priority from Japanese Patent Application No. 2017-146983, filed on 28 Jul. 2017, the content of which is incorporated herein by reference.

BACKGROUND OF THE INVENTION

Field of the Invention

The present invention relates to a motor controller that performs speed sensorless control for a motor.

Related Art

A motor controller that drives and controls a motor such as an induction motor or a synchronous motor is classified into a motor controller that uses a speed sensor such as a rotary encoder or a resolver and a motor controller that performs so-called speed sensorless control and does not e speed sensor. Patent Documents 1 and 2 disclose a motor controller that performs speed sensorless control for a motor.

For example, a motor controller disclosed in Patent Document 2 estimates a primary frequency and a slip frequency of a motor from an actual current value (a current FB value) of the motor, estimates a rotation speed of the motor by subtracting a slip frequency estimation value from a primary frequency estimation value, and drives and controls the motor on the basis of this rotation speed estimation value.

Such a motor controller has advantages in a low cost and a small size since the motor controller does not have a speed sensor. Moreover, since wiring for the speed sensor is not necessary, is possible to enhance water-repellent performance of the motor.

Patent Document Japanese Patent No. 5435252

Patent Document Japanese Unexamined Patent Application, Publication No. 2013-240194

SUMMARY OF THE INVENTION

However, in a machine tool that performs cutting the like, a speed attainment state in which a rotation speed of a motor that drives a spindle (a rotating shaft) reaches a speed command value and a speed zero state in which the motor stops (that is, the rotation speed of the motor is zero) are detected. For example, machining of a work starts when the speed attainment state is detected. On the other hand, a door of a work arrangement portion is unlocked when the speed zero state is detected (in order to secure safety).

In a motor controller that performs speed sensorless control for the motor, the speed attainment state and the speed zero state are detected on the basis of a rotation speed estimation value. However, in speed sensorless control, the rotation speed estimation value may differ greatly from an actual speed due to limitation of control performance, and the detection accuracy of the speed attainment state and the speed zero state may decrease.

Therefore, an object of the present invention is to provide a motor controller which performs speed sensorless control for a motor and which can enhance the detection accuracy of a speed attainment state in which the rotation speed of the motor reaches a speed command value and a speed zero state in which the rotation speed of the motor is zero.

(1) A motor controller (for example, a motor controller to be described later) according to the present invention is a motor controller that performs speed sensorless control for a motor (for example, an induction motor 3 to be described later), including: a rotation speed estimating unit (for example, a rotation speed estimating unit 30 to be described later) that estimates a rotation speed of the motor on the basis of current information and primary frequency information of the motor; a proximity switch (for example, a proximity switch 31 to be described later; that outputs an ON signal when a portion of a rotating body of the motor is in proximity and outputs an OFF signal when a portion of the rotating body of the motor is not in proximity; a rotation speed computing unit (for example, a rotation speed computing unit 32 to be described later) that computes a rotation speed of the motor on the basis of the ON signal and the OFF signal output from the proximity switch; and a state determining unit (for example, a state determining unit 34 to be described later) that determines whether a present state is a speed attainment state in which the rotation speed of the motor reaches a speed command value and whether a present state is a speed zero state in which the rotation speed of the motor is zero on the basis of a rotation speed estimation value estimated by the rotation speed estimating unit and a rotation speed computation value computed by the rotation speed computing unit.

(2) In the motor controller according to (1), the state determining unit may determine that the present state is the speed zero state when both the rotation speed estimation value estimated by the rotation speed estimating unit and the rotation speed computation value computed by the rotation speed computing unit are equal to or smaller than a first reference value.

(3) In the motor controller according (1) or (2), the state determining unit may determine that the present state is the speed attainment state when both the rotation speed estimation value estimated by the rotation speed estimating unit and the rotation speed computation value computed by the rotation speed computing unit are within a reference range including the speed command value.

(4) In the motor controller according to (3), the state determining unit may determine that the present state is the speed attainment state when both an absolute value of a speed deviation between the speed command value and the rotation speed estimation value and an absolute value of a speed deviation between the speed command value and the rotation speed computation value are equal to or smaller than a second reference value.

(5) The motor controller according to any one of (1) to (4) may further include: a state notification unit (for example, state notification unit 36 to be described later) that notifies a host controller of the speed attainment state or the speed zero state when the state determining unit determines that the present state is the speed attainment state or the speed zero state.

According to the present invention, it is possible to provide a motor controller which performs speed sensorless control for a motor and which can enhance the detection accuracy of a speed attainment state in which the rotation speed of the motor reaches a speed command value and a speed zero state in which the rotation speed of the motor is zero.

DETAILED DESCRIPTION OF THE INVENTION

Figure 1:
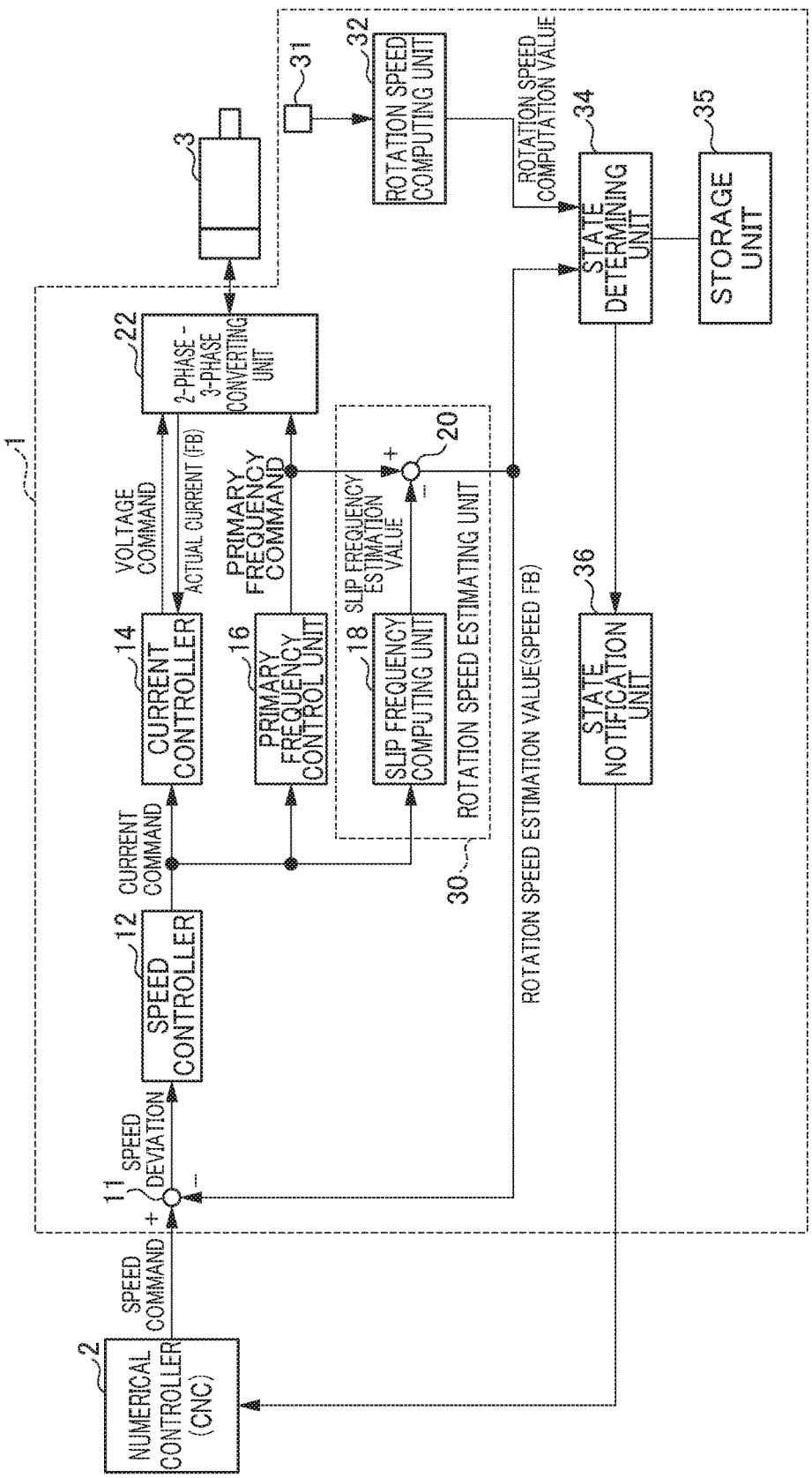
FIG. 1 is a diagram illustrating a configuration of motor controller according to the present embodiment.

Hereinafter, an example of an embodiment of the present invention will be described with reference to the accompanying drawings. In the respective drawings, the same or corresponding portions will be denoted by the same reference numerals.

FIG. 1 is a diagram illustrating a configuration of a motor controller according to the present embodiment. A motor controller 1 illustrated in FIG. 1 drives and controls an induction motor 3 according to a speed command which is supplied from a numerical controller (CNC) 2 and is based on a machining program.

The induction motor 3 drives a spindle (a rotating shaft) of a machine tool that performs cutting, for example. The induction motor 3 is so-called a speed sensorless motor that does not have a speed sensor such as a rotary encoder.

The motor controller 1 is a motor controller which performs so-called speed sensorless control which does not use a speed sensor such as a rotary encoder. The motor controller 1 performs vector control of the induction motor 3.

The motor controller 1 includes a subtractor 11, a speed controller 12, a current controller 14, a primary frequency control unit 16, a slip frequency computing unit 18, a subtractor 20, and a 2-phase-3-phase converting unit 22. The slip frequency computing unit 18 and the subtractor 20 form a rotation speed estimating unit 30.

The motor controller 1 further includes a proximity switch 31, a rotation speed computing unit 32, a state determining unit 34, a storage unit 35, and a state notification unit 36.

The subtractor 11 obtains a speed deviation between a speed command value supplied from the numerical controller 2 and a rotation speed estimation value (a speed FB) estimated by the rotation speed estimating unit 30 to be described later.

The speed controller 12 performs PI (proportional integral) control, for example, on the speed deviation obtained by the subtractor 11 to generate a current command value (a torque command value).

The current controller 14 generates a voltage command value on the basis of the current command value (a torque command value) generated by the speed controller 12 and an actual current value (a driving current value, a current FB value) of the motor 3 detected by a current detector (not illustrated). The current controller 14 performs vector control, for example. Specifically, the current controller 14 generates a d-phase current command value (an excitation current command value) and a q-phase current command value (a torque current command value) from the current command value (the torque command value). The current controller 14 generates a d-phase voltage command value on the basis of a difference between the d-phase current command value and a d-phase actual current value obtained by the 2-phase-3-phase converting unit 22 converting an actual current value of the three UVW phases. Moreover, the current controller 14 generates a q-phase voltage command value on the basis of a difference between the q-phase current command value and a q-phase actual current value obtained by the 2-phase-3-phase converting unit 22 converting an actual current value of the three UVW phases.

The primary frequency control unit 16 obtains a primary frequency command value on the basis of the current command value (the torque command value) generated by the speed controller 12.

Various methods are known as a method for calculating the primary frequency command value. For example, an actual current value (for example, a q-phase actual current value) may be used instead of the current command value, and a current deviation between the current command value (for example, a q-phase current command value) and an actual current value (for example, a q-phase actual current value) may be used instead of the current command value.

The slip frequency computing unit 18 computes a slip frequency estimation value on the basis of the current command value (the torque command value) generated by the speed controller 12. Specifically, the slip frequency computing unit 18 computes an optimum slip frequency of slip-frequency-control-type vector control on the basis of the d-phase current command value and the q-phase current command value to obtain a present slip frequency estimation value. For example, a slip frequency estimation value $\omega_s$ [rad/s] is obtained by the following equation based on a mutual inductance M, a secondary inductance $L_2$, a secondary resistance $R_2$, a secondary d-phase magnetic flux value $\phi_{2d}$, and a primary q-phase current value $i_{1q}$ of the motor 3.

$$\omega_s = \frac{MR_2}{L_2} \frac{i_{1q}}{\phi_{2d}}$$

Here, in a normal state, the secondary d-phase magnetic flux value $\phi_{2d}$ obtained by the following equation based on the mutual inductance M and a primary d-phase current value $i_{1d}$.

$$\phi_{2d} = Mi_{1d}$$

From this, the slip frequency estimation value $\omega_s$ in a normal state is obtained by the following equation.

$$\omega_s = \frac{R_2}{L_2} \frac{i_{1q}}{i_{1d}} = K \frac{i_{1q}}{i_{1d}}$$

In general, is called a slip constant.

Various methods are known as a method for calculating the slip frequency estimation value. For example, an actual current value (for example, a q-phase actual current value (FB) and a d-phase actual current value (FB)) may be used instead of the current command value.

The subtractor 20 obtains a rotation speed estimation value of the motor 3 by the following equation based on the primary frequency command value obtained by the primary frequency control unit 16 and the slip frequency estimation value obtained by the slip frequency computing unit 18.

(Rotation speed estimation value)=(Primary frequency command value)−(Slip frequency estimation value)

In the present embodiment, the slip frequency computing unit 18 and the subtractor 20 function as the rotation speed estimating unit 30. That is, the rotation speed estimating unit 30 estimates a slip frequency on the basis of the current command value (current information) generated by the speed controller 12 and a slip constant (that is, a motor constant) and estimates the rotation speed of the motor 3 on the basis of the slip frequency estimation value and the primary frequency command value (primary frequency information) generated by the primary frequency control unit 16. As described above, the rotation speed estimating unit 30 may use an actual current value (current information) instead of the current command value.

The 2-phase-3-phase converting unit 22 converts the d-phase voltage command value and the q-phase voltage command value generated by the current controller 14 to a voltage command value of the respective uvw phases on the basis of the primary frequency command value generated by the primary frequency control unit 16 to thereby generate a voltage command value for driving the induction motor 3.

The proximity switch 31 is provided in the induction motor 3. The proximity switch 31 may be included in the induction motor 3 and may be provided outside the induction motor 3.

The proximity switch 31 is a proximity switch defined by JIS C 8201-5-2 or IEC60947-5-2, for example, and is an inductive proximity switch, a capacitive proximity switch or the like that detects proximity of a metallic and/or nonmetallic object.

The proximity switch 31 outputs an ON signal when a portion of a shaft (a rotating body) of the motor 3 is in proximity and outputs an OFF signal when a portion of the shaft of the motor 3 is not in proximity.

Figure 2:
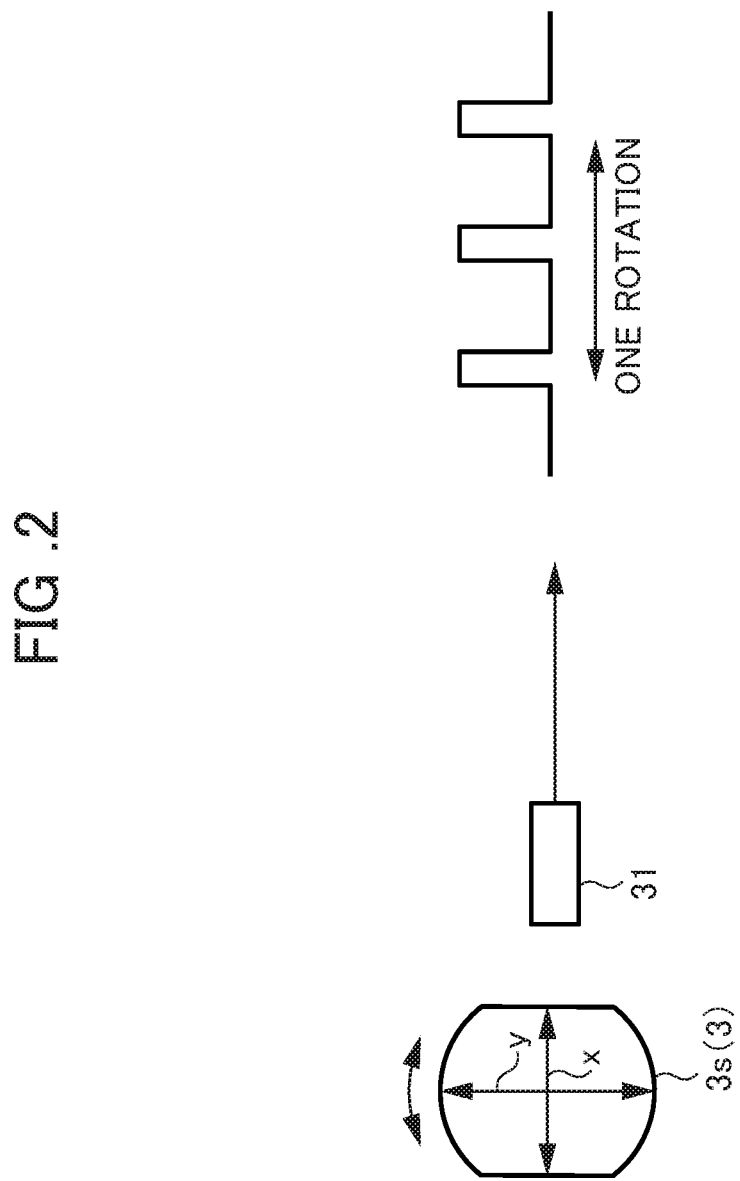
FIG. 2 is a diagram for describing an example of a proximity switch.

For example, as illustrated in FIG. 2, when two orthogonal diameters x and y of a shaft 3s of the motor 3 are different, the proximity switch 31 outputs an ON signal (a pulse signal of the HIGH level) when the longer diameter y portion is in proximity and outputs an OFF signal (a signal of the LOW level) when the longer diameter y portion is not in proximity. In the example of FIG. 2, since the longer diameter y portion is in proximity two times when the shaft 3s of the motor 3 rotates once, the proximity switch 31 outputs two pulse signals.

The shape of the shaft (rotating body) of the motor 3 is not limited to this. A sawtooth shape may be used as the shape of the shaft (rotating body) of the motor 3.

The proximity switch 31 is different from a speed sensor such as a rotary encoder used in a speed control system of a motor. A difference between a proximity switch and a rotary encoder will be described following.

A rotary encoder outputs A-phase signals and B-phase signals. Due to this, by using the rotary encoder, it is possible to detect a rotating position and a rotating direction in addition to a rotation speed. Moreover, the rotation speed and the rotating position can be detected with high accuracy and at a high speed.

On the other hand, the proximity switch outputs pulses of one phase much smaller than the number of phases of the output pulses of the rotary encoder (typically, pulses of one phase are output once or twice per rotation of the motor). Due to this, by using a proximity switch, it is possible to detect a rotation speed but cannot detect a rotating position and a rotating direction.

Moreover, when a rotation speed is computed from the pulse output of the proximity switch, since the number of pulses is counted at a predetermined sampling period, the counted number is converted to a speed, and the speed is averaged (smoothed), detection of the rotation speed takes a considerable amount of time. Furthermore, the detection resolution of the rotation speed determined by the sampling period and the averaging time is low. Since the rotation speed computed from the output pulses of the proximity switch has low responsiveness and resolution it is not possible to use the proximity switch in a speed control system unlike a rotary encoder.

In the present embodiment, the rotation speed of the motor is detected in the following manner using a proximity switch rather than a speed sensor such as a rotary encoder.

The rotation speed computing unit 32 computes the rotation speed of the motor 3 on the basis of the ON signal and the OFF signal output from the proximity switch 31.

For example, the rotation speed computing unit 32 counts the number of pulses of the ON signal output from the proximity switch 31 at a predetermined sampling period, converts the counted number to a speed, and averages (smoothes) the converted speed using a filter to thereby obtain the rotation speed of the motor 3.

In the case where the proximity switch 31 outputs n pulse signals when the shaft 3s of the motor 3 rotates once, the number of pulses generated in a sampling period Fs is converted to a speed by the following equation.

$$\text{Speed}(\min^{-1}) = 1/Fs \times 60/n$$

The speed computed by this equation is averaged by a filter. Due to this, as described above, the computed speed has a detection delay corresponding to a time constant of the filter.

The state determining unit 34 determines whether the present state is a speed attainment state in which the rotation speed of the motor 3 reaches a speed command value and whether the present state is a speed zero state (a motor stopping state) in which the rotation speed of the motor 3 is zero on the basis of the rotation speed estimation value estimated by the rotation speed estimating unit 30 and the rotation speed computation value computed by the rotation speed computing unit 32.

Specifically, when both the rotation speed estimation value and the rotation speed computation value are equal to or smaller than a first reference value stored in the storage unit 35, the state determining unit 34 determines that the present state is a speed zero state and detects a speed zero state.

Moreover, when both the rotation speed estimation value and the rotation speed computation value are within a reference range which is stored in the storage unit 35 and includes the speed command value, the state determining unit 34 determines that the present state is a speed attainment state and detects a speed attainment state. More specifically, when both an absolute value of a speed deviation between the speed command value and the rotation speed estimation value and an absolute value of a speed deviation between the speed command value and the rotation speed computation value are equal to or smaller than a second reference value (a value half the width of the reference range) stored in the storage unit 35, the state determining unit 34 determines that the present state is a speed attainment state and detects a speed attainment state.

The storage unit 35 previously stores the first reference value for determining the speed zero state and a reference range (the second reference value) for determining the speed attainment state. The storage unit 35 is a rewritable memory such as an EEPROM, for example.

When the state determining unit 34 determines that the present state is a speed attainment state and detects the speed attainment state, the state notification unit 36 notifies a speed attainment state detection signal indicating that the speed attainment state has been detected to the numerical controller (a host controller) 2.

Moreover, when the state determining unit 34 determines that the present state is a speed zero state and detects the speed zero state, the state notification unit 36 notifies a speed zero state detection signal indicating that the speed zero state has been detected to the numerical controller (the host controller) 2.

The subtractor 11, the speed controller 12, the current controller 14, the primary frequency control unit 16, the slip frequency computing unit 18, the subtractor 20, the 2-phase-3-phase converting unit 22, the rotation speed estimating unit 30, the rotation speed computing unit 32, the state determining unit 34, and the state notification unit 36 of the motor controller 1 as described above are configured as an arithmetic processor such as a digital signal processor (DSP) or a field-programmable gate array (FPGA), for example. The respective functions of the motor controller 1 are realized by executing predetermined software (a program, an application) stored in a storage unit, for example. The respective functions of the motor controller 1 may be realized by cooperation of hardware and software and may be realized by hardware (electronic circuits) only.

Figure 3:
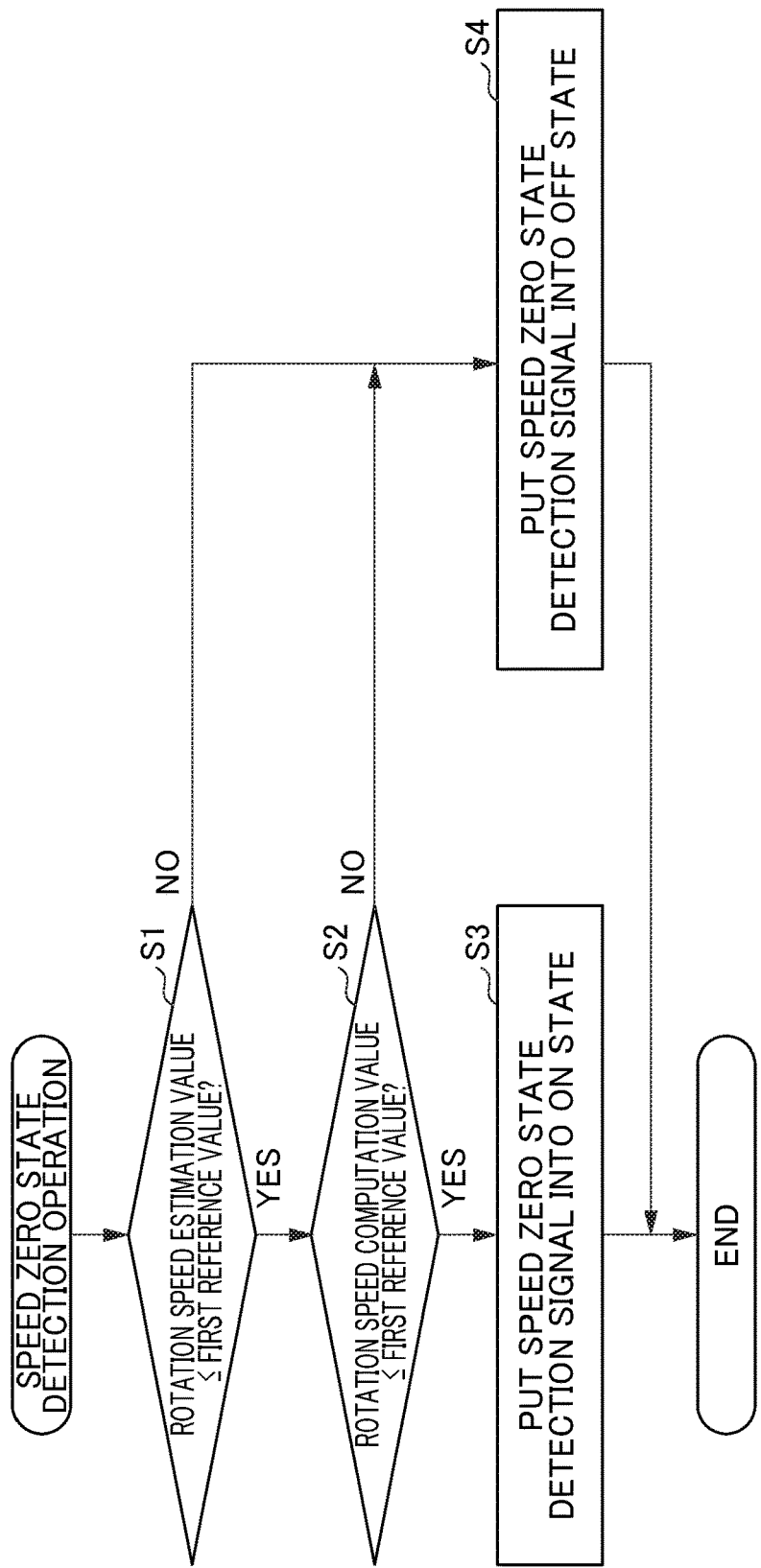
FIG. 3 is a flowchart illustrating an operation of detecting a speed zero state by a motor controller according to the present embodiment.

Next, a speed zero state detection operation of the motor controller 1 of the present embodiment will be described with reference to FIG. 3. FIG. 3 is a flowchart illustrating a speed zero state detection operation of the motor controller 1 of the present embodiment.

First, the rotation speed estimating unit 30 estimates a slip frequency on the basis of the current command value generated by the speed controller 12 and the slip constant and estimates a rotation speed of the motor 3 on the basis of the slip frequency estimation value and the primary frequency command value generated by the primary frequency control unit 16. Moreover, the rotation speed computing unit 32 computes the rotation speed of the motor 3 on the oasis of the ON signal and the OFF signal output from the proximity switch 31.

Subsequently, as illustrated in FIG. 3, the state determining unit 34 determines whether the rotation speed estimation value estimated by the rotation speed estimating unit 30 is equal to or smaller than the first reference value (S1).

In step S1, when the rotation speed estimation value is equal to or smaller than the first reference value, the state determining unit 34 determines whether the rotation speed computation value computed by the rotation speed computing unit 32 is equal to or smaller than the first reference value (32).

In step 32, when the rotation speed computation value is equal to or smaller than the first reference value, that is both the rotation speed estimation value and the rotation speed computation value are equal to or smaller than the first reference value, the state determining unit 34 determines that the present state is a speed zero state and detects the speed zero state.

In this case, the state notification unit 36 puts the speed zero state detection signal to an ON state and notifies the numerical controller 2 of the speed zero state (S3).

On the other hand, when it is determined in step S1 that the rotation speed estimation value is larger than the first reference value or it is determined in step S2 that the rotation speed computing value is larger than the first reference value (that is, either the rotation speed estimation value or the rotation speed computation value is larger than the first reference value), the state determining unit 34 determines that the present state is not the speed zero state.

In this case, the state notification unit 36 puts the speed zero state detection signal into an OFF state (S4).

Figure 4:
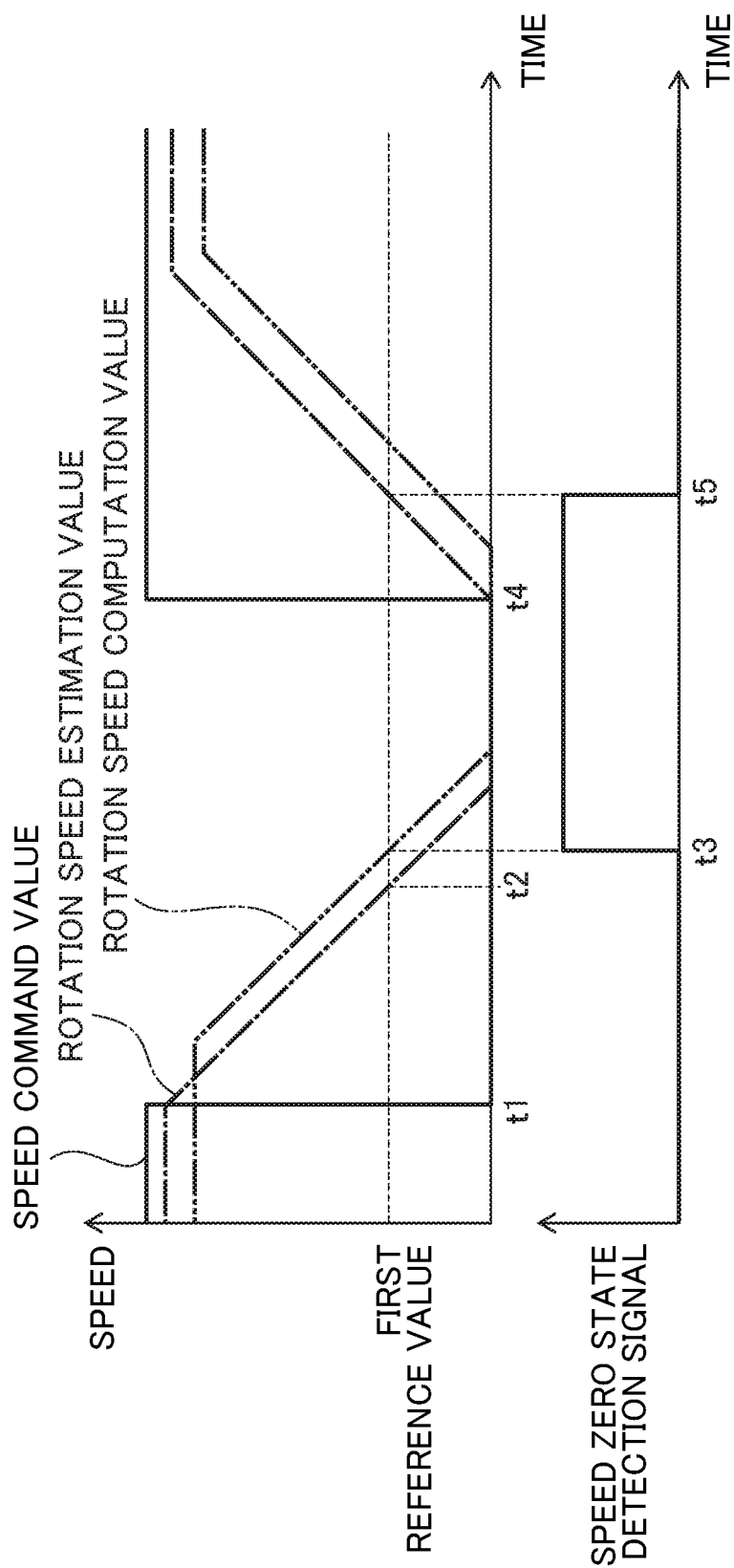
FIG. 4 is a diagram illustrating waveforms of respective units of the motor controller according to the present embodiment.

Next, a speed zero state detection operation of the motor controller 1 of the present embodiment will be described in more detail with reference to FIG. 4. FIG. 4 is a diagram illustrating the waveforms of respective units of the motor controller 1 of the present embodiment.

In FIG. 4, a solid line indicates a speed command value, a one-dot-chain line indicates a rotation speed estimated by the rotation speed estimating unit 30, and a two-dot-chain line indicates a rotation speed computed by the rotation speed computing unit 32. FIG. 4 also illustrates a speed zero state detection signal.

At time t1, when the speed command value reaches zero, the rotation speed estimation value decreases and the rotation speed computation value decreases with a delay corresponding to the time constant of the filter of the rotation speed computing unit 32. In this case, the speed zero state detection signal is in the OFF state.

At time t2, although the rotation speed estimation value is equal to or smaller than the first reference value (S1 of FIG. 3: YES), since the rotation speed computation value is larger than the first reference value (S2 of FIG. 3: NO), the speed zero state detection signal remains in the OFF state (S4 in FIG. 3).

At time t3, when the rotation speed computation value becomes equal to or smaller than the first reference value (that is, when both the rotation speed estimation value and the rotation speed computation value are equal to or smaller than the first reference value (S2 in FIG. 3: YES)), the speed zero state detection signal is in the ON state and the numerical controller 2 is notified of the speed zero state (S3 in FIG. 3).

After that, at time t4, when the speed command value is supplied, the rotation speed estimation value increases and the rotation speed computation value increases with a delay corresponding to the time constant of the filter of the rotation speed computing unit 32. In this case, the speed zero state detection signal remains in the ON state.

At time t5, when the rotation speed estimation value becomes larger than the first reference value, even when the rotation speed computation value is equal to or smaller than the first reference value, the speed zero state detection signal is in the OFF state and notification of the speed zero state is stopped. That the present embodiment, when either the rotation speed estimation value or the rotation speed computation value becomes larger than the first reference value, notification of the speed zero state is stopped.

When both the rotation speed estimation value and the rotation speed computation value are larger than the first reference value, notification of the speed zero state may be stopped.

Figure 5:
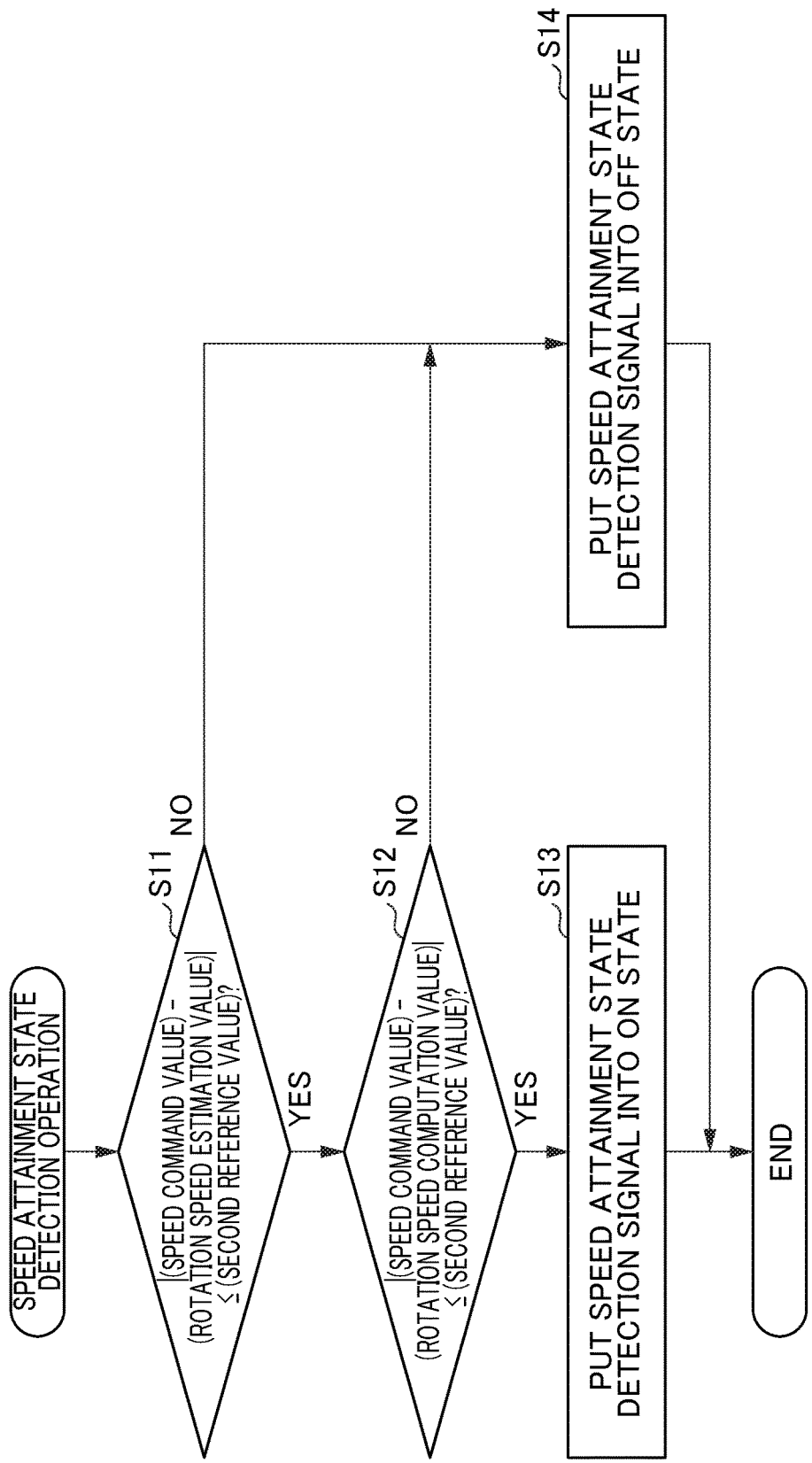
FIG. 5 is a flowchart illustrating an operation of detecting a speed attainment state by the motor controller according to the present embodiment.

Next, a speed attainment state detection operation of the motor controller 1 of the present embodiment will be described with reference to FIG. 5. FIG. 5 is a flowchart illustrating a speed attainment state detection operation of the motor controller of the present embodiment.

First, the rotation speed estimating unit 30 estimates the slip frequency on the basis of the current command value generated by the speed controller 12 and the slip constant and estimates the rotation speed of the motor 3 on the basis of the slip frequency estimation value and the primary frequency command value generated by the primary frequency control unit 16. Moreover, the rotation speed computing unit 32 computes the rotation speed of the motor on the basis of the ON signal and the OFF signal from the proximity switch 31.

Subsequently, as illustrated in FIG. 5, the state determining unit 34 determines whether the rotation speed estimation value estimated the rotation speed estimating unit 30 is within a reference range. Specifically, the state determining unit 34 determines whether the absolute value of the speed deviation between the speed command value and the rotation speed estimation value is equal to or smaller than the second reference value (a value half the width of the reference range) (S11).

In step S11, when the absolute value of the speed deviation is equal to or smaller than the second reference value (that is, the rotation speed estimation value is within the reference range), the state determining unit 34 determines whether the rotation speed computation value computed by the rotation speed computing unit 32 is within the reference range. Specifically, the state determining unit 34 determines whether the absolute value of the speed deviation between the speed command value and the rotation speed computation value is equal to or smaller than the second reference value (S12).

In step S12, when the absolute value of the speed deviation is equal to or smaller than the second reference value (that is, when the rotation speed computation value is within the reference range) (that is, when both the rotation speed estimation value and the rotation speed computation value are within the reference range), the state determining unit 34 determines that the present state is the speed attainment state and detects the speed attainment state.

In this case, the state notification unit 36 puts the speed attainment state detection signal into the ON state and notifies the numerical controller 2 of the speed attainment state (S13).

On the other hand, when it is determined in step S11 that the rotation speed estimation value is not within the reference range or when it is determined in step S12 that the rotation speed computing value is not within the reference range (that is, when either the rotation speed estimation value or the rotation speed computation value is not within the reference range), the state determining unit 34 determines that the present state is not the speed attainment state.

In this case, the state notification unit 36 puts the speed attainment state detection signal into the OFF state (S14).

Figure 6:
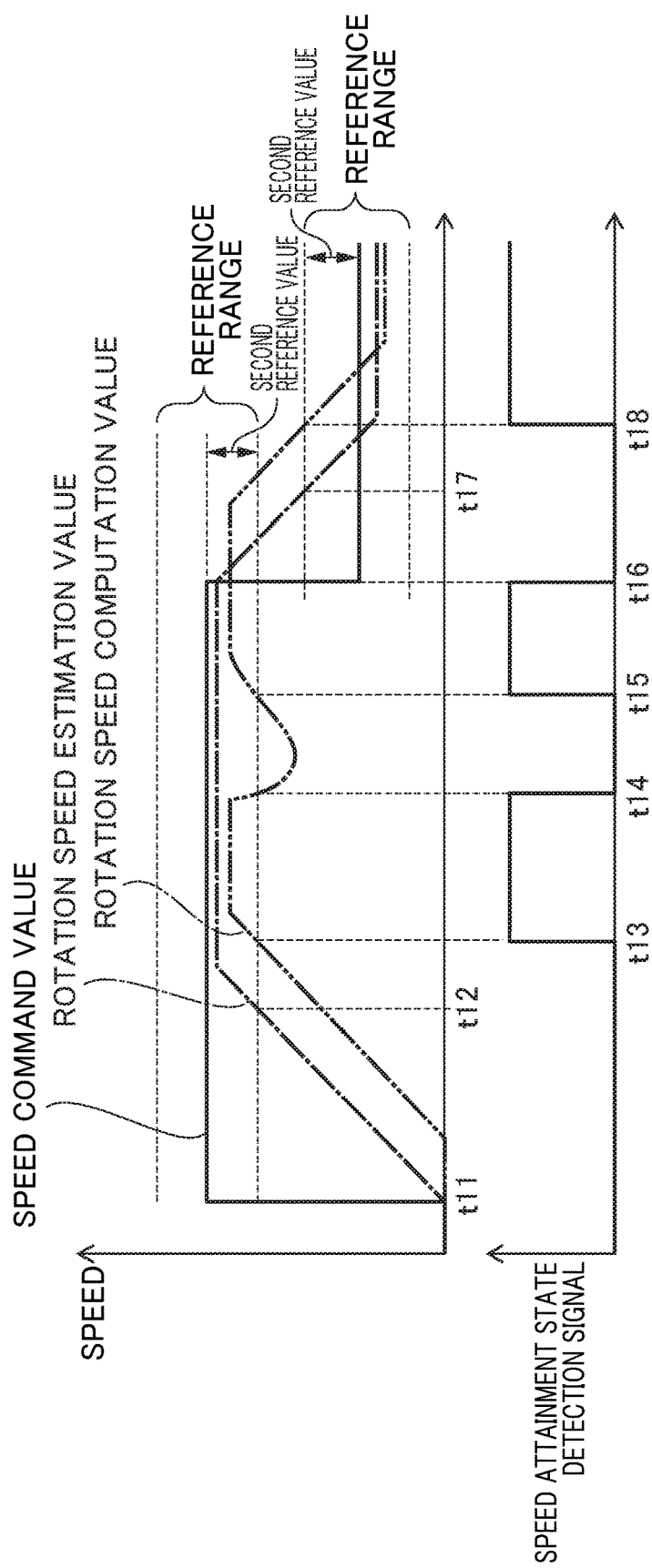
FIG. 6 is a diagram illustrating waveforms of respective units of the motor controller according to the present embodiment.

Next, the speed attainment state detection operation of the motor controller 1 of the present embodiment will be described in more detail with reference to FIG. 6. FIG. 6 is a diagram illustrating the waveforms of respective units of the motor controller 1 of the present embodiment.

In FIG. 6, a solid line indicates a speed command value, a one-dot-chain line indicates a rotation speed estimated by the rotation speed estimating unit 30, and a two-dot-chain line indicates a rotation speed computed by the rotation speed computing unit 32. FIG. 6 also illustrates a speed attainment state detection signal.

A time t11, when the speed command value is supplied, the rotation speed estimation value increases and the rotation speed computation value increases with a delay corresponding to the time constant of the filter of the rotation speed computing unit 32. In this case, the speed attainment state detection signal is in the OFF state.

At time t12, although the rotation speed estimation value is within the once range (S11 in FIG. 5: YES), since the rotation speed computation value is not within the reference range (S12 in FIG. 5: NO), the speed attainment state detection signal remains in the OFF state (S14 in FIG. 5).

At time t13, when the rotation speed computation value is within the reference range (that is, when both the rotation speed estimation value and the rotation speed computation value are within the reference range) (S12 in FIG. 5: YES), the speed attainment state detection signal is in the ON state and the numerical controller 2 is notified of the speed attainment state (S13 in FIG. 5).

After that, in a period between time points t14 and t15, when the rotation speed computation value only decreases and deviates from the reference range due to disturbance or the like, for example, the speed attainment state detection signal is in the OFF state. That is, in the present embodiment, when either the rotation speed estimation value or the rotation speed computation value is not in the reference range, notification of the speed attainment state is stopped. When both the rotation speed estimation value and the rotation speed computation value are not within the reference range, notification of the speed attainment state may be stopped.

Moreover, when the speed command value changes (decreases) at time t16, the rotation speed estimation value decreases and the rotation speed computation value decreases with a delay corresponding to the time constant of the filter of the rotation speed computing unit 32. In this case, since both the rotation speed estimation value and the rotation speed computation value deviate from the reference range, the speed attainment state detection signal is in the OFF state.

After that, at time t17, although the rotation speed estimation value is within the reference range (S11 in FIG. 5: YES), since the rotation speed computation value is not within the reference range (S12 in FIG. 5: NO), the speed attainment state detection signal remains in the OFF state (S14 in FIG. 5).

At time t18, when the rotation speed computation value is also within the reference range (that is, both the rotation speed estimation value and the rotation speed computation value are within the reference range) (S12 in FIG. 5: YES), the speed attainment state detection signal is in the ON state and the numerical controller 2 is notified of the speed attainment state (S13 in FIG. 5).

Here, in a conventional motor controller that performs speed sensorless control for a motor, the speed attainment state and the speed zero state are detected on the basis of a rotation speed estimation value. However, in speed sensorless control, the rotation speed estimation value may differ greatly from an actual speed due to limitation of control performance, and the detection accuracy of the speed attainment state and the speed zero state may decrease.

In contrast, according to the motor controller 1 of the present embodiment, the rotation speed estimating unit 30 estimates the rotation speed of the motor 3 on the basis of the current command value (current information) of the motor 3 and the primary frequency command value (primary frequency information), and the rotation speed computing unit 32 computes the rotation speed of the motor 3 on the basis of the ON signal and the OFF signal output from the proximity switch 31. The state determining unit 34 determines whether the present state is a speed attainment state in which the rotation speed of the motor 3 reaches the speed command value and whether the present state is a speed zero state in which the rotation speed of the motor 3 is zero on the basis of the rotation speed computation value computed by the rotation speed computing unit 32 in addition to the rotation speed estimation value estimated by the rotation speed estimating unit 30.

In this manner, by using the rotation speed computation value computed on the basis of the ON/OFF state of the proximity switch 31 in addition to the rotation speed estimation value estimated on the basis of the current command value, it is possible to enhance the detection (determination) accuracy of the speed attainment state and the speed zero state.

According to the motor controller 1 of the present embodiment, the state notification unit 36 notifies the numerical controller (the host controller) 2 of the speed attainment state or the speed zero state when the state determining unit 34 determines that the present state is the speed attainment state or the speed zero state.

In this way, the numerical controller (the host controller) 2 can recognize the speed attainment state and the speed zero state of the spindle (the rotating shaft) of a machine tool with high accuracy.

While an embodiment of the present invention has been described, the present invention is not limited to the above-described embodiment. The advantages described in the present embodiment are examples of the most preferable advantages obtained from the present invention, and the advantages of the present invention are not limited to those described in the present embodiment.

For example, in the above-described embodiment, although a motor controller that controls an induction motor has been illustrated, the feature of the present invention is not limited to this but can be applied to a motor controller that controls various motors. For example, the feature of the present invention can be also applied to a motor controller that performs speed sensorless control on a so-called speed sensorless synchronous motor that does not have a speed sensor such as a resolver. Since a difference in a rotation speed estimation value and an actual rotation speed in speed sensorless control of an induction motor is larger than a difference between a speed estimation value and an actual speed in speed sensorless control of a synchronous motor, the feature of the present invention is ideally applied to a motor controller that performs speed sensorless control on an induction motor.

EXPLANATION OF REFERENCE NUMERALS

1: Motor controller
2: Numerical controller (CNC)
3: Induction motor
3s: Shaft
11, 20: Subtractor
12: Speed controller
14: Current controller
16: Primary frequency control unit
18: Slip frequency computing unit
22: 2-phase-3-phase converting unit
30: Rotation speed estimating unit
31: Proximity switch
32: Rotation speed computing unit
34: State determining unit
35: Storage unit
36: State notification unit

What is claimed is:

1. A motor controller that performs speed sensorless control for a motor, comprising:
    a rotation speed estimating unit that estimates a rotation speed of the motor based on current information and primary frequency information of the motor;
    a proximity switch that outputs an ON signal when a portion of a rotating body of the motor is in proximity and outputs an OFF signal when a portion of the rotating body of the motor is not in proximity;
    a rotation speed computing unit that computes a rotation speed of the motor based on the ON signal and the OFF signal output from the proximity switch; and
    a state determining unit that determines whether a present state is a speed attainment state in which the rotation speed of the motor reaches a speed command value and whether a present state is a speed zero state in which the rotation speed of the motor is zero based on rotation speed estimation value estimated by the rotation speed estimating unit and a rotation speed computation value computed by the rotation speed computing unit.

2. The motor controller according to claim 1, wherein the state determining unit determines that the present state is the speed zero state when both the rotation speed estimation value estimated by the rotation speed estimating unit and the rotation speed computation value computed by the rotation speed computing unit are equal to or smaller than a first reference value.

3. The motor controller according to claim 1, wherein the state determining unit determines that the present state is the speed attainment state when both the rotation speed estimation value estimated by the rotation speed estimating unit and the rotation speed computation value computed by the rotation speed computing unit are within a reference range including the speed command value.

4. The motor controller according to claim 3, wherein the state determining unit determines that the present state is the speed attainment state when both an absolute value of a speed deviation between the speed command value and the rotation speed estimation value and an absolute value of a speed deviation between the speed command value and the rotation speed computation value are equal to or smaller than a second reference value.

5. The motor controller according to claim 1, further comprising: a state notification unit that notifies a host controller of the speed attainment state or the speed zero state when the state determining unit determines that the present state is the speed attainment state or the speed zero state.

* * * * *